United States Patent
Ortmann et al.

(10) Patent No.: US 10,487,891 B2
(45) Date of Patent: Nov. 26, 2019

(54) TEMPERATURE BASED CLUTCH CONTROL

(71) Applicant: Ford Global Technologies, LLC, Dearborn, MI (US)

(72) Inventors: Walter Joseph Ortmann, Saline, MI (US); Bernard D. Nefcy, Novi, MI (US); Todd McCullough, Bloomfield Hills, MI (US); Christopher Alan Lear, Dearborn, MI (US); Daniel Scott Colvin, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 749 days.

(21) Appl. No.: 15/015,642

(22) Filed: Feb. 4, 2016

(65) Prior Publication Data

US 2017/0227075 A1    Aug. 10, 2017

(51) Int. Cl.
| | |
|---|---|
| *F16D 48/06* | (2006.01) |
| *B60K 6/48* | (2007.10) |
| *B60W 10/08* | (2006.01) |
| *B60W 20/00* | (2016.01) |
| *B60W 10/02* | (2006.01) |
| *B60W 30/18* | (2012.01) |

(52) U.S. Cl.
CPC ............... *F16D 48/06* (2013.01); *B60K 6/48* (2013.01); *B60W 10/026* (2013.01); *B60W 10/08* (2013.01); *B60W 20/00* (2013.01); *B60W 30/18127* (2013.01); *B60K 2006/4825* (2013.01); *B60W 2510/0291* (2013.01); *F16D 2500/104* (2013.01); *F16D 2500/10487* (2013.01); *F16D 2500/50287* (2013.01); *F16D 2500/50816* (2013.01); *Y02T 10/6221* (2013.01); *Y02T 10/6252* (2013.01); *Y10S 903/946* (2013.01)

(58) Field of Classification Search
None
See application file for complete search history.

(56) References Cited

U.S. PATENT DOCUMENTS

| | | | |
|---|---|---|---|
| 6,113,515 A * | 9/2000 | Salecker | ............... F16D 48/064 |
| | | | 192/82 T |
| 7,708,095 B2 * | 5/2010 | Hirata | ................... B60K 6/365 |
| | | | 180/65.275 |
| 8,721,496 B2 | 5/2014 | Nefcy et al. | |
| 8,894,542 B2 | 11/2014 | Aoki et al. | |
| 9,758,149 B2 * | 9/2017 | Doering | ................ B60W 30/19 |
| 2014/0129119 A1 | 5/2014 | Park | |
| 2015/0087475 A1 | 3/2015 | Dai et al. | |

* cited by examiner

*Primary Examiner* — Colby M Hansen
(74) *Attorney, Agent, or Firm* — David B. Kelley; Brooks Kushman P.C.

(57) ABSTRACT

A vehicle includes a clutch to couple a motor and transmission, and a controller that, in response to a regenerative braking request and a temperature being within a first range, partially capacitizes the clutch for regenerative torque transfer therethrough with slip, and in response to another regenerative braking request and the temperature being within a second range less than the first, fully capacitizes the clutch prior to regenerative torque transfer therethough to preclude slip.

8 Claims, 2 Drawing Sheets

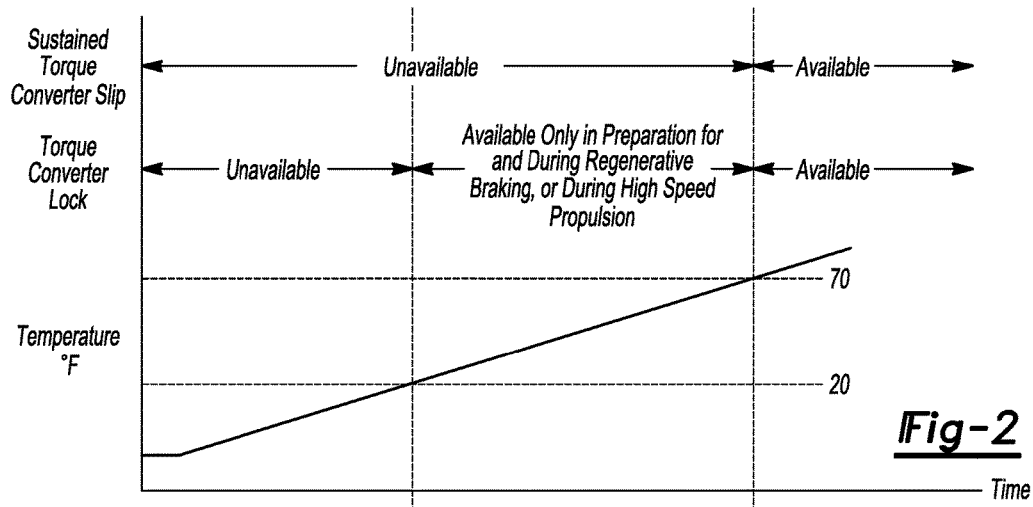
Fig-2
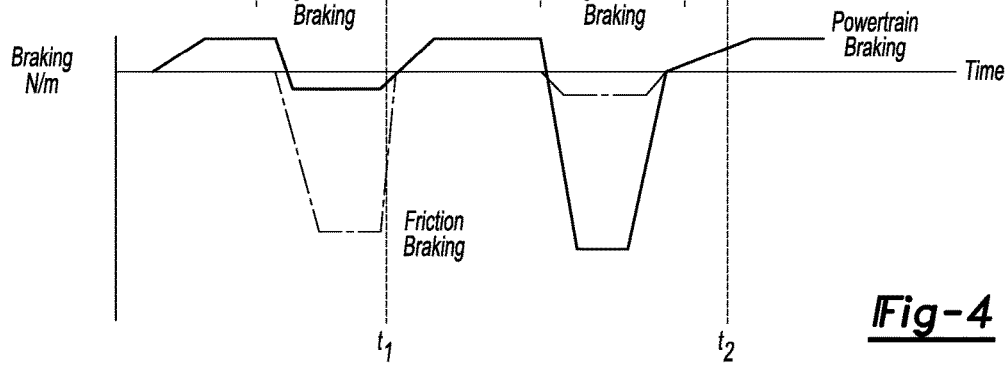
Fig-3
Fig-4

TEMPERATURE BASED CLUTCH CONTROL

TECHNICAL FIELD

This disclosure relates to strategies for control of a vehicle clutch arranged to selectively couple a motor and transmission.

BACKGROUND

An engine, electric machine and transmission may be serially arranged along a driveline of an automotive vehicle. A clutch may be used to selectively mechanically couple the engine and electric machine. Likewise, a clutch may be used to selectively mechanically couple the electric machine and transmission. As such, the engine, electric machine, or both may provide propulsive torque for wheels of the vehicle.

SUMMARY

A vehicle includes a clutch to couple a motor and transmission, and a controller programmed to, in response to a regenerative braking request and a temperature being within a first range, partially capacitize the clutch for regenerative torque transfer therethrough with slip, and in response to another regenerative braking request and the temperature being within a second range less than the first, fully capacitize the clutch prior to regenerative torque transfer therethough to preclude slip.

A vehicle includes a clutch configured to couple a motor and transmission, and a controller programmed to, in response to a temperature being within a first range, partially capacitize the clutch during propulsive torque transfer therethrough, and in response to another regenerative braking request and the temperature being within a second range less than the first, fully capacitize the clutch prior to regenerative torque transfer therethough.

A method includes, by a controller, in response to a regenerative braking request and a temperature being within a first range, partially capacitizing a clutch, to couple a motor and transmission, during regenerative torque transfer therethrough, and in response to another regenerative braking request and the temperature being within a second range less than the first, fully capacitizing the clutch prior to regenerative torque transfer therethough.

BRIEF DESCRIPTION OF THE DRAWINGS

FIG. 2 is a plot of temperature, torque converter lock availability, and torque converter slip availability versus time.

FIG. 3 is a plot of vehicle speed and torque converter lock state versus time.

FIG. 4 is a plot of friction and powetrain braking versus time.

DETAILED DESCRIPTION

Figure 1:
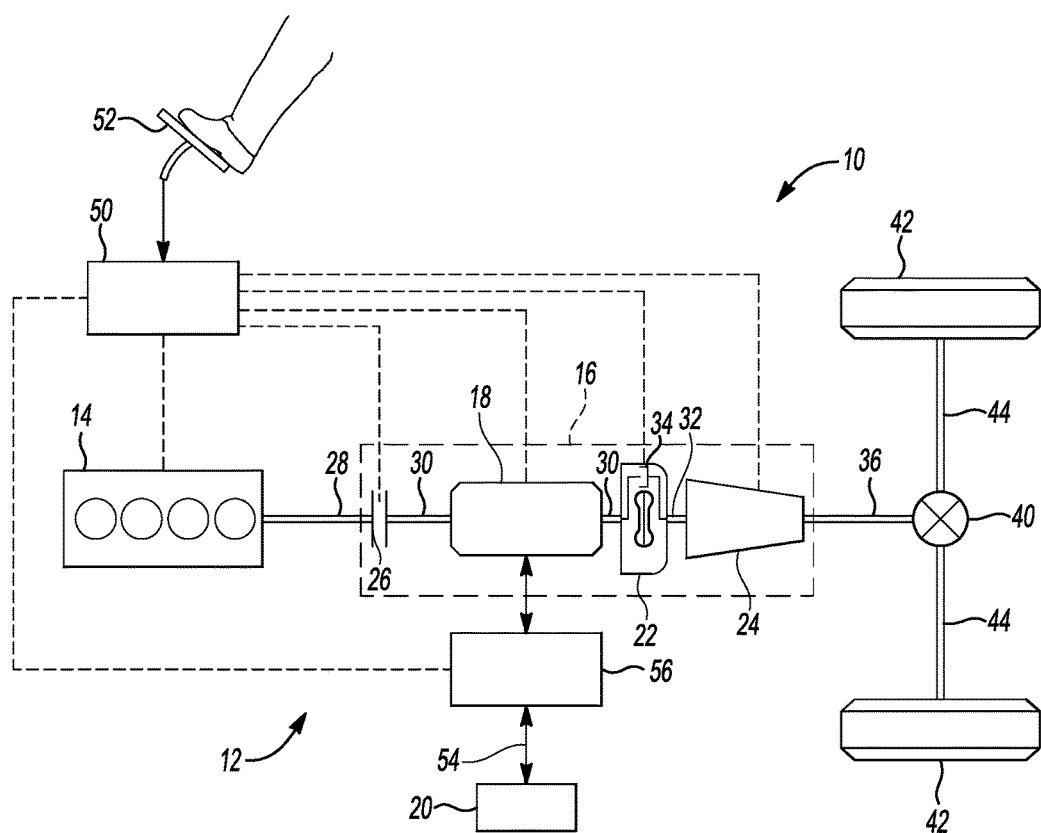
FIG. 1 is a schematic diagram of a vehicle.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments.

As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Typically during warm up of a transmission, an associated torque converter bypass clutch will not be operated until the transmission oil temperature exceeds a certain threshold (e.g., 70° F.). This ensures reliable and smooth operation. As a benefit, an open torque converter bypass clutch will cause the torque converter to operate at a more lossy state—heating the transmission oil faster. Another reason torque converters are not typically locked at lower operating temperatures is that slip control is needed during shifting. The ability to control slip under lower temperature operation is greatly reduced as capacity control is reduced. As a result, the cost benefit of a locked/slipping (improving fuel economy/keeping shifts smooth) torque converter at lower temperatures does not exceed the drivability that an open torque converter affords.

An issue associated with a torque converter bypass clutch strategy that avoids low temperature lock is that the collection of regenerative energy during a braking event is severely reduced. It is difficult for a torque converter that is optimized to transmit torque from an engine or electric machine to a driveline to transmit torque from the driveline to the electric machine using only the fluid of the torque converter. This is due to the optimized fin design which uses the momentum of the fluid to transmit torque in the "positive" direction (from input to driveline). This fin design, however, results in poor performance when the torque transmission is in the opposite direction (from driveline to input) such as during a regenerative braking event. Certain embodiments herein provide for locking of a torque converter bypass clutch (or other clutch arranged to couple a motor and transmission) at low temperatures during regenerative braking events to improve energy capture. Other arrangements, however, are also contemplated.

FIG. 1 is a schematic diagram of a hybrid electric vehicle (HEV) 10 illustrating representative example relationships among components. Physical placement and orientation of the components within the vehicle, however, may vary. The HEV 10 includes a powertrain 12. And, the powertrain 12 includes an engine 14 that drives a transmission 16. As will be described in further detail below, transmission 16 includes an electric machine such as an integrated starter-generator (ISG) 18, an associated traction battery 20, a torque converter 22, and a multiple step-ratio automatic transmission or gearbox 24.

The engine 14 and ISG 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the ISG 18 when a disconnect clutch 26 between the engine 14 and the ISG 18 is at least partially engaged. The ISG 18 may be implemented by any one of a plurality of types of electric machines. For example, the ISG 18 may be a permanent magnet synchronous motor. Power electronics condition direct current (DC) power provided by the battery 20 for the ISG 18, as will be described below. The power electronics, for example, may provide three phase alternating current (AC) to the ISG 18.

When the disconnect clutch 26 is at least partially engaged, power flow from the engine 14 to the ISG 18 or from the ISG 18 to the engine 14 is possible. For example, the disconnect clutch 26 may be engaged and the ISG 18 may operate as a generator to convert rotational energy provided by a crankshaft 28 and ISG shaft 30 into electrical energy to be stored in the battery 20. The disconnect clutch 26 can also be disengaged to isolate the engine 14 from the remainder of the powertrain 12 such that the ISG 18 can act as the sole drive source for the HEV 10. The shaft 30 extends through the ISG 18. The ISG 18 is continuously drivably connected to the shaft 30, whereas the engine 14 is drivably connected to the shaft 30 only when the disconnect clutch 26 is at least partially engaged.

The schematic illustrated in FIG. 1 is merely exemplary and is not intended to be limiting. Other configurations are contemplated that utilize selective engagement of both an engine and a motor to transmit torque through a transmission. For example, the ISG 18 may be offset from the crankshaft 28, an additional motor may be provided to start the engine 14, and/or the ISG 18 may be provided between the torque converter 22 and gearbox 24.

The ISG 18 is also connected to the torque converter 22 via the shaft 30. The torque converter 22 is therefore connected to the engine 14 when the disconnect clutch 26 is at least partially engaged. The torque converter 22 includes an impeller fixed to the shaft 30 and a turbine fixed to a transmission input shaft 32. It thus provides a hydraulic coupling between the shaft 30 and transmission input shaft 32, and transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque.

A torque converter bypass clutch 34 may, when engaged, frictionally or mechanically couple the impeller and turbine of the torque converter 22, permitting more efficient power transfer. The torque converter bypass clutch 34 may be operated as a launch clutch to provide smooth vehicle launch. Alternatively, or in combination, a launch clutch similar to the disconnect clutch 26 may be provided between the ISG 18 and gearbox 24 for applications that do not include a torque converter 22 or a torque converter bypass clutch 34. In some applications, the disconnect clutch 26 is generally referred to as an upstream clutch, and the launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). The gearbox 24 then provides powertrain output torque to the output shaft 36.

The torque converter 22 and hydraulically controlled gearbox 24 is, of course, one example of a gearbox or transmission arrangement; any multiple ratio gearbox that accepts input torque(s) from an engine and/or motor, and then provides torque to an output shaft at the different ratios is acceptable for use with embodiments of the present disclosure. For example, the gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements.

The output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). As such, the powertrain control unit 50 and one or more other controllers can collectively be referred to as a "controller" that controls various actuators in response to signals from various sensors to control functions such as starting/stopping engine 14, operating the ISG 18 to provide wheel torque or charge the battery 20, select or schedule transmission shifts, etc.

The controller may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM). Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine 14 or vehicle 10. Additionally, the controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU.

The controller 50 may communicate signals to and/or from the engine 14, ISG 18, disconnect clutch 26, launch clutch 34, transmission gearbox 24, and power electronics 56. Although not explicitly illustrated, those of ordinary skill will recognize various functions or components that may be controlled by the controller 50 within each of the subsystems identified above. Representative examples of functions, parameters, systems, and/or components that may be directly or indirectly actuated using control logic executed by the controller 50 include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, ISG operation, clutch pressures for the disconnect clutch 26, launch clutch 34, and transmission gearbox 24, etc.

Control logic or functions performed by the controller 50 may be represented by flow charts or other diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill will recognize that one or more of the illustrated steps or functions may be repeatedly performed depending upon the particular processing strategy being used. Similarly, the order of processing is not necessarily required to achieve the features and advantages described herein, but is provided for ease of illustration and description.

The control logic may be implemented primarily in software executed by a microprocessor-based vehicle, engine, and/or powertrain controller, such as the controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle 10 or its subsystems. The computer-readable storage devices or media may include one or more of a number of known physical devices which utilize electric, magnetic, and/or optical storage to keep executable instructions and associated calibration information, operating variables, etc.

An accelerator pedal 52 is used by the driver of the vehicle to provide a demanded torque, power, or drive command to propel the vehicle 10. In general, depressing and releasing the pedal 52 generates an accelerator pedal position signal that may be interpreted by the controller 50 as a demand for increased power or decreased power, respectively. Based at least upon input from the pedal, the controller 50 commands torque from the engine 14 and/or the ISG 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle 10 with the engine 14, the disconnect clutch 26 is at least partially engaged to transfer at least a portion of the engine torque through the disconnect clutch 26 to the ISG 18, and then from the ISG 18 through the torque converter 22 and gearbox 24. When the engine 14 alone provides the torque necessary to propel the vehicle, this operation mode may be referred to as the "engine mode," "engine-only mode," or "mechanical mode." The ISG 18 may assist the engine 14 by providing additional power to turn the shaft 30. This operation mode may be referred to as a "hybrid mode," an "engine-motor mode," or an "electric-assist mode."

To drive the vehicle with the ISG 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the ISG 18. The controller 50 commands the power electronics 56 to convert voltage from the battery 20 to an AC voltage provided to the ISG 18 to provide positive or negative torque to the shaft 30. This operation mode may be referred to as an "electric only mode," "EV (electric vehicle) mode," or "motor mode."

FIGS. 2, 3 and 4 show that torque converter lock availability is unavailable at temperatures less than, in this example, 20° F., is available only in preparation for and during regenerative braking, or during high speed propulsion (e.g., 50 mph) at temperatures between, in this example, 20° F. and 70° F., and is available at temperatures greater than, in this example, 70° F. That is, the controller 50 does not permit locking of the torque converter bypass clutch 34 at temperatures less than 20° F. The controller 50 permits locking of the torque converter bypass clutch 34 at temperatures between 20° F. and 70° F., but only in preparation for and during regenerative braking, or during high speed propulsion. And, the controller 50 permits locking of the torque converter bypass clutch 34 at temperatures greater than 70° F. regardless of braking activity. Other temperature ranges, of course, are contemplated (e.g., 25° F. instead of 20° F. and 65° F. instead of 70° F., etc.) and may depend on design considerations and customer expectations. The temperature could be that of ambient air, engine coolant, motor coils, a motor inverter, transmission oil, etc.

FIGS. 2, 3 and 4 also show that the torque converter bypass clutch 34 cannot be slipping upon initiation of (or during) regenerative braking at temperatures less than 70° F. as slip is difficult to control at lower temperatures. This capability is only available at temperatures greater than 70° F. As such, the torque converter bypass clutch 34 may be partially capacitized (slipping) just prior to initiation of (and during) regenerative braking at temperatures above 70° F. The torque converter bypass clutch 34, at temperatures less than 70° F., is fully capacitized (no sustained slipping) prior to initiation of (and during) regenerative braking.

The controller 50 may further initiate other operations during regenerative torque transfer through the torque converter bypass clutch 34 while the temperature is less than 70° F. The controller 50, for example, may command a shift of the transmission 16, command a change in amount of the regenerative braking request prompting the regenerative braking, command driveline damping, etc.

With particular attention to FIGS. 3 and 4, the controller 50 in this example locks the torque converter bypass clutch 34 during the regenerative braking defined by the use of powertrain braking, instead of friction braking, to reduce a speed of the vehicle 10 during a portion of the time period from t1 to t2: In response to a request for regenerative braking during this time period, the controller 50 may only fully capacitize the torque converter bypass clutch 34 and then initiate regenerative braking via the ISG 18. That is, the controller 50 may not partially capacitize the torque converter bypass clutch 34 and then initiate regenerative braking via the ISG 18. After time t2 (which coincides with the temperature exceeding 70° F.), the controller 50 may lock or slip the torque converter bypass clutch 34 as needed without regard to whether regenerative braking is taking place. As an example, the controller 50 may slip the torque converter bypass clutch 34 during regenerative torque transfer.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
a clutch to couple a motor and transmission; and
a controller programmed to, in response to a regenerative braking request and an ambient, engine coolant, motor coil, motor inverter coolant, or transmission oil temperature being within a first range, partially capacitize the clutch for regenerative torque transfer therethrough with slip, and in response to another regenerative braking request and the ambient, engine coolant, motor coil, motor inverter coolant, or transmission oil temperature being within a second range less than the first, fully capacitize the clutch prior to regenerative torque transfer therethough to preclude slip.

2. The vehicle of claim 1, wherein the controller is further programmed to command a shift during regenerative torque transfer through the clutch without slip while the ambient, engine coolant, motor coil, motor inverter coolant, or transmission oil temperature is within the second range.

3. The vehicle of claim 1, wherein the controller is further programmed to command a change in amount of the another regenerative braking request during regenerative torque transfer through the clutch without slip while the ambient, engine coolant, motor coil, motor inverter coolant or transmission oil temperature is within the second range.

4. The vehicle of claim 1, wherein the controller is further programmed to command driveline damping during regenerative torque transfer through the clutch without slip while the ambient engine coolant, motor coil, motor inverter coolant, or transmission oil temperature is within the second range.

5. A vehicle comprising:
a clutch configured to couple a motor and transmission; and
a controller programmed to, in response to an. ambient. engine coolant, motor coil, motor inverter coolant, or transmission oil temperature being within a first range, partially capacitize the clutch during propulsive torque transfer therethrough, and in response to regenerative braking request and the ambient, engine coolant, motor coil, motor inverter coolant, or transmission oil temperature being within a second range less than the first, fully capacitize the clutch prior to regenerative torque transfer therethough.

6. The vehicle of claim 5, wherein the controller is further programmed to command a shift during regenerative torque transfer through the clutch without slip while the ambient, engine coolant, motor coil, motor inverter coolant, or transmission oil temperature is within the second range.

7. The vehicle of claim 5, wherein the controller is further programmed to command a change in amount of the another regenerative braking request during regenerative torque transfer through the clutch without slip while the ambient, engine coolant, motor coil motor inverter coolant, or transmission oil temperature is within the second range.

8. The vehicle of claim 5, wherein the controller is further programmed to command driveline damping during regenerative torque transfer through the clutch without slip while the ambient, engine coolant, motor coil, motor inverter coolant, or transmission oil temperature is within the second range.

* * * * *